United States Patent
Kwon et al.

(10) Patent No.: US 8,617,258 B2
(45) Date of Patent: Dec. 31, 2013

(54) CABLE-TYPE SECONDARY BATTERY AND MANUFACTURING METHOD THEREOF

(75) Inventors: Yo-Han Kwon, Daejeon (KR); Je-Young Kim, Daejeon (KR); Hyung-Ju Ahn, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/404,119

(22) Filed: Feb. 24, 2012

(65) Prior Publication Data
US 2012/0156554 A1   Jun. 21, 2012

Related U.S. Application Data

(63) Continuation of application No. PCT/KR2011/007756, filed on Oct. 18, 2011.

(30) Foreign Application Priority Data

Nov. 4, 2010   (KR) .................. 10-2010-0109196

(51) Int. Cl.
*H01M 4/82* (2006.01)
*H01M 2/10* (2006.01)

(52) U.S. Cl.
USPC ........................................ 29/623.1; 429/186

(58) Field of Classification Search
None
See application file for complete search history.

(56) References Cited

U.S. PATENT DOCUMENTS 6,040,085 A * 3/2000 Cheu et al. ................... 429/185

FOREIGN PATENT DOCUMENTS

| JP | 04169066 A | * | 6/1992 |
| JP | 08-088019 A | | 4/1996 |
| JP | 09-007629 A | | 1/1997 |
| KR | 20050099903 A | | 10/2005 |
| KR | 20070009231 A | | 1/2007 |
| KR | 20070075928 A | | 7/2007 |
| WO | WO 2005098994 A1 | * | 10/2005 |

* cited by examiner

*Primary Examiner* — Ula C Ruddock
*Assistant Examiner* — Daniel Gatewood
(74) *Attorney, Agent, or Firm* — Lerner, David, Littenberg, Krumholz & Mentlik, LLP

(57) ABSTRACT

Provided is a method for manufacturing a cable-type secondary battery including preparing an electrode assembly having a horizontal cross section of a predetermined shape and extending longitudinally, the electrode assembly including an inner current collector, an anode active material layer, a cathode active material layer, and an electrolyte layer interposed between the anode active material layer and the cathode active material layer, preparing a heat-shrinkable protection coating by forming a thin-film outer current collector on the inner surface of a heat-shrinkable tube, and inserting the electrode assembly into the heat-shrinkable protection coating and heating to shrink the heat-shrinkable protection coating such that the shrunken protection coating is closely adhered to the outer surface of the electrode assembly.

The manufacturing method may eliminate the need of post-processing such as drying, thereby simplifying the method and carrying out the method in a continuous manner.

11 Claims, 1 Drawing Sheet

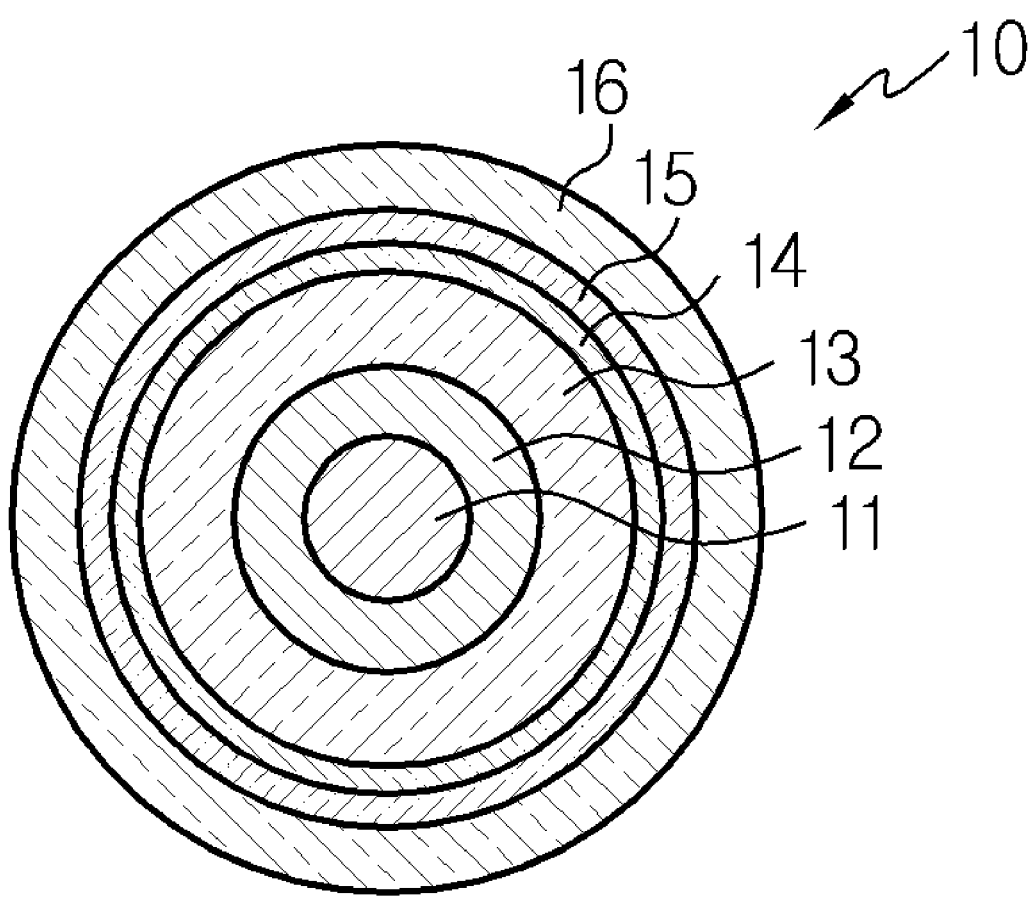

CABLE-TYPE SECONDARY BATTERY AND MANUFACTURING METHOD THEREOF

CROSS REFERENCE TO RELATED APPLICATIONS

The present application is a national phase entry under 35U.S.C. §371 of International Application No. PCT/KR2011/007756, filed Oct. 18, 2011, published in English, which claims priority from Korean Patent Application No. 10-2010-0109196, filed Nov. 4, 2010, all of which are incorporated herein by reference.

BACKGROUND

1. Technical Field

The present invention relates to a method for manufacturing a cable-type secondary battery of free shape adaptation, and more particularly, to a method for forming a protection coating of a cable-type secondary battery.

2. Background Art

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop linear batteries having a very high ratio of length to cross-sectional diameter. Korean Patent No. 0804411 discloses a linear battery comprising a plurality of anodes and a plurality of cathodes with separators interposed therebetween. Korean Patent Registration No. 0742739 discloses a thread-type flexible battery including cathode threads and anode threads, however this is not easily adaptable in shape. However, a specific method for forming a protection coating suitable for such a linear battery is not disclosed.

DISCLOSURE

Technical Problem

It is an object of the present invention to provide a method for forming a protection coating suitable for a cable-type secondary battery of a linear structure extending longitudinally.

Technical Solution

A method for manufacturing a cable-type secondary battery according to the present invention may include preparing an electrode assembly having a horizontal cross section of a predetermined shape and extending longitudinally, the electrode assembly including an inner current collector, an anode active material layer, a cathode active material layer, and an electrolyte layer interposed between the anode active material layer and the cathode active material layer, a preparing a heat-shrinkable protection coating by forming a thin-film outer current collector on the inner surface of a heat-shrinkable tube, and inserting the electrode assembly into the heat-shrinkable protection coating and heating to shrink the heat-shrinkable protection coating such that the shrunken protection coating is closely adhered to the outer surface of the electrode assembly.

The thin-film outer current collector may be a half pipe-type or a mesh-type. Also, the thin-film outer current collector may be formed of a metal paste layer, and the metal paste layer may include aluminum, nickel, titanium, copper, or silver.

In this instance, the current collector is preferably made from stainless steel, aluminum, nickel, titanium, sintered carbon, or copper; stainless steel surface-treated with carbon, nickel, titanium, or silver; aluminum-cadmium alloys; non-conductive polymer surface-treated with a conductive material; or conductive polymers. The conductive material may be polyacetylene, polyaniline, polypyrrole, polythiophene, polysulfur nitride, indium thin oxide (ITO), copper, silver, palladium, or nickel, and the conductive polymer may be polyacetylene, polyaniline, polypyrrole, polythiophene, or polysulfur nitride.

The anode active material layer may be formed from an active material including an active material particle of any one selected from the group consisting of natural graphite, artificial graphite, or carbonaceous materials; lithium-containing titanium composite oxides (LTOs); metals (Me) including Si, Sn, Li, Zn, Mg, Cd, Ce, Ni, and Fe; alloys of the metals (Me); oxides (MeOx) of the metals (Me); and composites of the metals (Me) and carbon, or mixtures thereof. The cathode active material layer may be formed from an active material including an active material particle of any one selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$, or mixtures (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

The electrolyte layer may be formed from a gel polymer electrolyte of polyethylene oxide (PEO), polyvinylidene fluoride (PVdF), polymethylmethacrylate (PMMA), polyacrylonitrile (PAN), or polyvinylacetate (PVAc); or a solid polymer electrolyte of PEO, polypropylene oxide (PPO), polyethylene imine (PEI), polyethylene sulphide (PES), or PVAc.

In the manufacturing method of the present invention, the electrolyte layer may further include a lithium salt. The lithium salt may be LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chlorine borane lithium, aliphatic lower lithium carbonate, or tetra phenyl lithium borate.

Also, the cable-type secondary battery manufactured by the manufacturing method of the present invention may include an electrode assembly having a horizontal cross section of a predetermined shape and extending longitudinally and a heat-shrinkable protection coating surrounding the electrode assembly in close contact with the electrode assembly and having a thin-film outer current collector on the inner surface of the heat-shrinkable protection coating, the electrode assembly including an inner current collector, an anode active material layer, a cathode active material layer, and an electrolyte layer interposed between the anode active material layer and the cathode active material layer.

DESCRIPTION OF DRAWINGS

The accompanying drawing illustrates a preferred embodiment of the present disclosure and, together with the foregoing disclosure, serves to provide further understanding of the technical spirit of the present disclosure. However, the present disclosure is not to be construed as being limited to the drawings.

FIG. 1 is a cross-sectional view of a cable-type secondary battery according to an embodiment of the present invention.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

A method for manufacturing a cable-type secondary battery according to the present invention may include (S1) preparing an electrode assembly having a horizontal cross section of a predetermined shape and extending longitudinally, the electrode assembly including an inner current collector, an anode active material layer, a cathode active material layer, and an electrolyte layer interposed between the anode active material layer and the cathode active material layer, (S2) preparing a heat-shrinkable protection coating by forming a thin-film outer current collector on the inner surface of a heat-shrinkable tube, and (S3) inserting the electrode assembly into the heat-shrinkable protection coating and heating to shrink the heat-shrinkable protection coating such that the shrunken protection coating is closely adhered to the outer surface of the electrode assembly.

Here, the order of steps (S1) and (S2) is not limited in this regard, and (S2) may precede (S1). Also, the predetermined shape is not limited to a specific shape, and may include any shape without departing from the spirit and scope of the present invention. The cable-type secondary battery of the present invention has a horizontal cross section of a predetermined shape and a linear structure extending longitudinally, perpendicular to the horizontal cross section. The cable-type secondary battery has flexibility and consequently free shape adaptation.

The electrode assembly of the present invention is not limited to a specific type, and may be any type of electrode assembly including a cathode and an anode, and an electrolyte layer as an ion channel between the cathode and the anode, to allow a general electrochemical reaction, and an inner electrode consists of the inner current collector and the cathode active material layer or anode active material layer. An outer electrode consists of an outer current collector and an active material layer, and in this instance, the active material layer needs to be formed on the outmost surface of the electrode assembly in contact with the outer current collector.

The electrode assembly having a horizontal cross section of a predetermined shape and extending longitudinally, including an inner current collector, an anode active material layer, a cathode active material layer, and an electrolyte layer interposed between the anode active material layer and the cathode active material layer is prepared.

(S1)

The electrode assembly may be manufactured using a general manufacturing method, for example, by forming the active material layer on the inner current collector using extrusion-coating, followed by drying, to form the inner electrode, and by coating the inner electrode with the electrolyte layer. The electrolyte layer may be mainly formed from a gel polymer electrolyte or a solid polymer electrolyte. Alternatively, the electrode assembly may be manufactured by coating the electrolyte layer with the active material layer. The coating may be performed using hot dipping, sputtering, chemical vapor deposition, and the like, preferably extrusion-coating.

A heat-shrinkable protection coating is prepared by forming a thin-film outer current collector on the inner surface of a heat-shrinkable tube. (S2)

The heat-shrinkable tube is a tube that shrinks when heated, and configured to air-tightly seal a terminal or a material having a shape or size different from that of the tube. The heat-shrinkable tube is mainly made from polymer resins, and used for the purpose of insulation and the like. A suitable heat-shrinkable tube to achieve the object of the present invention may be available in commercial heat-shrinkable tubes of various materials and shapes on the market.

The thin-film outer current collector of metal is formed on the inner surface of the heat-shrinkable tube to prepare a heat-shrinkable protection coating. Here, the outer current collector is not limited to a specific type.

When a half pipe-type outer current collector is used, two or three outer current collectors may be adhered to the heat-shrinkable tube to completely surround the outer surface of the electrode assembly. In this instance, the outer current collectors are arranged to maintain a predetermined interval in consideration of the heat-shrinkable tube shrinking.

When a mesh-type outer current collector ensuring a predetermined elasticity is used, the outer current collector may be tailored to completely surround the outer surface of the electrode assembly.

Also, when a metal paste-based outer current collector is used, the outer current collector may be coated on the inner surface of the heat-shrinkable tube.

The heat-shrinkable tube needs enough rigidity to support itself with an inlet port open since the heat-shrinkable tube is inserted into a lithium ion battery using an automatic coater before it is heated to shrink. Also, it is preferred to heat the heat-shrinkable tube at a low temperature, preferably 120° C. or less, to prevent heat damage from occurring to a lithium battery.

The electrode assembly is inserted into the heat-shrinkable protection coating and heated to shrink the heat-shrinkable protection coating such that the shrunken protection coating is closely adhered to the outer surface of the electrode assembly. (S3)

The manufacturing method of the present invention forms the protection coating using the heat-shrinkable tube, and thus, may eliminate the need of post-processing such as drying, thereby simplifying the method and carrying out the method in a continuous manner. Also, the manufacturing method forms the protection coating by simply using an inserting process, and thus, may facilitate the method.

The outer current collector of the cable-type secondary battery is mainly formed from metal materials, and thus, when the outer current collector is formed on the outer surface of the active material layer, the adhesion between the outer current collector and the active material layer may reduce. Also, when the electrode assembly is inserted into a pipe-type outer current collector of metal, a gap may be formed between the electrode assembly and the outer current collector, which may reduce the adhesion therebetween, thereby deteriorating the performance of the battery. However, according to the present invention, the thin-film outer current collector is formed on the inner surface of the heat-shrinkable tube, and when heated, is closely adhered to the active material layer, thereby preventing the deterioration in performance of the battery.

The heat-shrinkable tube shrinks by heat to come in close contact with the electrode assembly, and the thin-film outer current collector formed on the inner surface of the heat-shrinkable tube surrounds the active material layer of the electrode assembly in close contact with the active material layer, to form an outer electrode. In this instance, the heating temperature is preferably no more than 120° C. to prevent heat damage from occurring to the lithium battery.

A cable-type secondary battery manufactured by the manufacturing method according to an embodiment of the present invention is schematically illustrated in FIG. 1. Although a few exemplary embodiments of the present invention are shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

Referring to FIG. 1, a cable-type secondary battery 10 manufactured by the manufacturing method according to an embodiment of the present invention includes an electrode assembly having a horizontal cross section of a predetermined shape and extending longitudinally and a heat-shrinkable protection coating 16 surrounding the electrode assembly in close contact with the electrode assembly and having a thin-film outer current collector 15 on the inner surface of the heat-shrinkable protection coating 16, the electrode assembly including an inner current collector 11, an anode active material layer 12, a cathode active material layer 14, and an electrolyte layer 13 interposed between the anode active material layer 12 and the cathode active material layer 14.

The thin-film outer current collector 15 may be a half pipe-type current collector or a mesh-type current collector, or may be formed of a metal paste coating layer.

When a half pipe-type outer current collector is used, two or three outer current collectors may be adhered to the heat-shrinkable tube to completely surround the outer surface of the electrode assembly. In this instance, the outer current collectors are arranged to maintain a predetermined interval in consideration of the heat-shrinkable tube shrinking.

When a mesh-type outer current collector ensuring a predetermined elasticity is used, the outer current collector may be tailored to completely surround the outer surface of the electrode assembly.

Also, when a metal paste-based outer current collector is used, the outer current collector may be coated on the inner surface of the heat-shrinkable tube.

In this instance, the current collector 10 and 50 is preferably made from stainless steel, aluminum, nickel, titanium, sintered carbon, or copper; stainless steel surface-treated with carbon, nickel, titanium, or silver; aluminum-cadmium alloys; non-conductive polymers surface-treated with a conductive material; or conductive polymers. The conductive material may be polyacetylene, polyaniline, polypyrrole, polythiophene, polysulfur nitride, indium thin oxide (ITO), copper, silver, palladium, or nickel. The conductive polymer may be polyacetylene, polyaniline, polypyrrole, polythiophene, or polysulfur nitride.

The anode active material layer 12 may include, but is not limited to, natural graphite, artificial graphite, or carbonaceous materials; lithium-containing titanium composite oxides (LTOs); metals (Me) such as Si, Sn, Li, Zn, Mg, Cd, Ce, Ni, and Fe; alloys of the metals (Me); oxides (MeOx) of the metals (Me); and composites of the metals (Me) and carbon. The cathode active material layer 14 may include, but is not limited to, $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

The electrolyte layer 13 may be formed from a gel polymer electrolyte of polyethylene oxide (PEO), polyvinylidene fluoride (PVdF), polymethylmethacrylate (PMMA), polyacrylonitrile (PAN), or polyvinylacetate (PVAc); or a solid polymer electrolyte of PEO, polypropylene oxide (PPO), polyethylene imine (PEI), polyethylene sulphide (PES), or PVAc.

In the manufacturing method of the present invention, the electrolyte layer 13 may further include a lithium salt. The lithium salt may be, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, or tetra phenyl lithium borate.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

EXAMPLE

An inner current collector, an anode active material layer, an electrolyte layer, and a cathode active material layer were prepared and assembled into an electrode assembly having a horizontal cross section of a predetermined shape and extending longitudinally.

A polyethylene terephthalate (PET)-based heat-shrinkable tube was prepared.

Two aluminum half pipe-type outer current collectors were adhered onto the inner surface of the heat-shrinkable tube with an adhesive.

The electrode assembly was inserted into the heat-shrinkable tube, followed by heating at 80° C. for three minutes, to form a protection coating on the outer surface of the electrode assembly. In this way, a cable-type secondary battery was completed.

According to teachings above, the manufacturing method of the present invention forms the protection coating using the heat-shrinkable tube, and thus, may eliminate the need of post-processing such as drying, thereby simplifying the method and carrying out the method in a continuous manner. Also, the manufacturing method forms the outer current collector on the inner surface of the heat-shrinkable tube, and thus, may improve the adhesion between the active material layer and the outer current collector, thereby preventing the deterioration in performance of the battery.

What is claimed is:

1. A method for manufacturing a cable-type secondary battery, the method comprising:

preparing an electrode assembly having a horizontal cross section of a predetermined shape and extending longitudinally, the electrode assembly including an inner current collector, an anode active material layer, a cathode active material layer, and an electrolyte layer interposed between the anode active material layer and the cathode active material layer;

preparing a heat-shrinkable protection coating by forming a thin-film outer current collector on the inner surface of a heat-shrinkable tube; and inserting the electrode assembly into the heat-shrinkable protection coating and heating to shrink the heat-shrinkable protection coating such that the thin-film outer current collector formed on the inner surface of the shrunken protection coating is closely adhered to the cathode active material layer on the outer surface of the electrode assembly.

2. The method for manufacturing a cable-type secondary battery according to claim 1, wherein the outer current collector is a half pipe-type current collector.

3. The method for manufacturing a cable-type secondary battery according to claim 1, wherein the inner current collector is made from stainless steel, aluminum, nickel, titanium, sintered carbon, or copper; stainless steel surface-treated with carbon, nickel, titanium, or silver; aluminum-cadmium alloys; non-conductive polymer surface-treated with a conductive material; or conductive polymers.

4. The method for manufacturing a cable-type secondary battery according to claim 1, wherein the outer current collector is made from stainless steel, aluminum, nickel, titanium, sintered carbon, or copper; stainless steel surface-treated with carbon, nickel, titanium, or silver; aluminum-cadmium alloys; non-conductive polymer surface-treated with a conductive material; or conductive polymers.

5. The method for manufacturing a cable-type secondary battery according to claim 3 or 4, wherein the conductive material is any one selected from the group consisting of polyacetylene, polyaniline, polypyrrole, polythiophene, polysulfur nitride, indium thin oxide (ITO), copper, silver, palladium, and nickel, or mixtures thereof.

6. The method for manufacturing a cable-type secondary battery according to claim 3 or 4, wherein the conductive polymer is any one selected from the group consisting of polyacetylene, polyaniline, polypyrrole, polythiophene, and polysulfur nitride, or mixtures thereof.

7. The method for manufacturing a cable-type secondary battery according to claim 1, wherein the anode active material layer is formed from an active material including an active material particle of any one selected from the group consisting of natural graphite, artificial graphite, or carbonaceous materials; lithium-containing titanium composite oxides (LTOs); metals (Me) including Si, Sn, Li, Zn, Mg, Cd, Ce, Ni, and Fe; alloys of the metals (Me); oxides (MeOx) of the metals (Me); and composites of the metals (Me) and carbon, or mixtures thereof.

8. The method for manufacturing a cable-type secondary battery according to claim 1, wherein the cathode active material layer is formed from an active material including an active material particle any one selected from the group consisting of $LiCoO_2$, $LiMn_2O_4$, $LiCoPO_4$, $LiFePO_4$, $LiNiMnCoO_2$, and $LiNi_{1-x-y-z}Co_xM1_yM2_zO_2$, or mixtures (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

9. The method for manufacturing a cable-type secondary battery according to claim 1, wherein the electrolyte layer is formed from an electrolyte selected from the group consisting of a gel polymer electrolyte of polyethylene oxide (PEO), polyvinylidene fluoride (PVdF), polymethylmethacrylate (PMMA), polyacrylonitrile (PAN), or polyvinylacetate (PVAc); and a solid polymer electrolyte of PEO, polypropylene oxide (PPO), polyethylene imine (PEI), polyethylene sulphide (PES), or PVAc.

10. The method for manufacturing a cable-type secondary battery according to claim 1, wherein the electrolyte layer further includes a lithium salt.

11. The method for manufacturing a cable-type secondary battery according to claim 10, wherein the lithium salt is any one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, and tetra phenyl lithium borate, or mixtures thereof.

* * * * *

UNITED STATES PATENT AND TRADEMARK OFFICE
CERTIFICATE OF CORRECTION

PATENT NO.         : 8,617,258 B2                                          Page 1 of 1
APPLICATION NO.    : 13/404119
DATED              : December 31, 2013
INVENTOR(S)        : Yo-Han Kwon, Je-Young Kim and Hyung-Ju Ahn It is certified that error appears in the above-identified patent and that said Letters Patent is hereby corrected as shown below:

In the Claims

Column 8, line 27, after "$LiCoO_2$," insert --$LiNiO_2$--.

Signed and Sealed this
Fifth Day of January, 2016

Michelle K. Lee
*Director of the United States Patent and Trademark Office*